United States Patent
Vandewal et al.

[19]

[11] Patent Number: 5,839,552
[45] Date of Patent: Nov. 24, 1998

[54] METHOD AND APPARATUS FOR DELIVERING FLUID AND OR ELECTRIC SIGNALS

[75] Inventors: Bart Vandewal, Alken, Belgium; Yoram Guy, Ann Arbor, Mich.

[73] Assignee: Tenneco Automotive Inc., Lake Forest, Ill.

[21] Appl. No.: 878,420

[22] Filed: Jun. 18, 1997

Related U.S. Application Data

[62] Division of Ser. No. 445,173, May 19, 1995, abandoned.

[51] Int. Cl.⁶ ........................................................ I16F 9/00
[52] U.S. Cl. .................................. 188/321.11; 188/322.16
[58] Field of Search ........... 188/321.11, 322.16–322.18; 280/668, 671, 673, 693, 698, 702, 709

[56] References Cited

U.S. PATENT DOCUMENTS

| | | | |
|---|---|---|---|
| 3,954,255 | 5/1976 | Keijzer et al. | 267/34 |
| 4,305,486 | 12/1981 | Cowan | 188/319 |
| 4,660,688 | 4/1987 | Spisak et al. | 188/299 |
| 4,687,223 | 8/1987 | Miyoshi et al. | 280/707 |
| 4,861,005 | 8/1989 | Bausch | 248/562 |
| 5,163,660 | 11/1992 | Yamaoka et al. | 267/136 |
| 5,314,045 | 5/1994 | Fenn et al. | 188/322.21 |
| 5,328,005 | 7/1994 | Van Breemen | 188/322.21 |
| 5,458,219 | 10/1995 | Anderson | 188/322.21 |
| 5,529,155 | 6/1996 | Jones et al. | 188/322.21 |
| 5,579,814 | 12/1996 | Jones et al. | 188/322.21 |

*Primary Examiner*—Robert J. Oberleitner
*Assistant Examiner*—Chris Schwartz
*Attorney, Agent, or Firm*—Harness, Dickey & Pierce, PLC

[57] ABSTRACT

A telescopic cylinder (10) is disposed between the sprung (22) and unsprung (14, 18) portions of an automotive vehicle and is in fluid communication with a source of fluid external to the telescopic cylinder (10). The telescopic cylinder (10) includes the housing (46) which is operable to receive the fluid. The telescopic cylinder (1) also includes a mount (48) which is operable to secure the housing (46) of the telescopic cylinder (10) to the automotive vehicle (12). The mount (48) includes a fluid passage (66) for allowing fluid to flow from the source of fluid through the mount (48) to the housing (46).

4 Claims, 3 Drawing Sheets

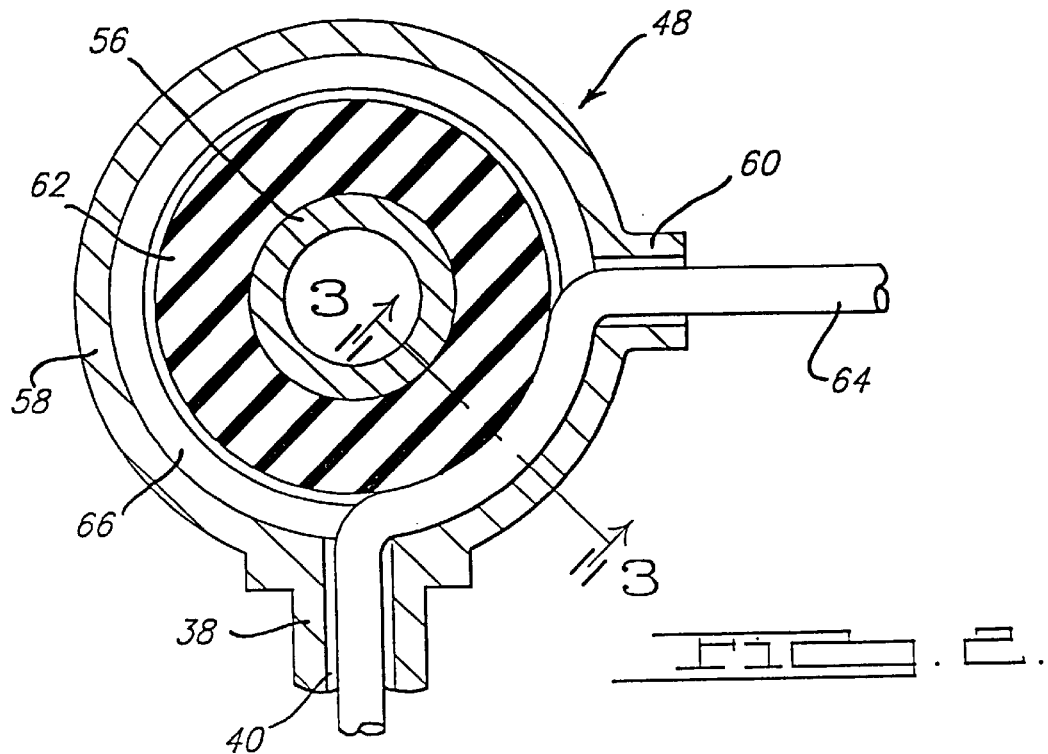
FIG. 2.
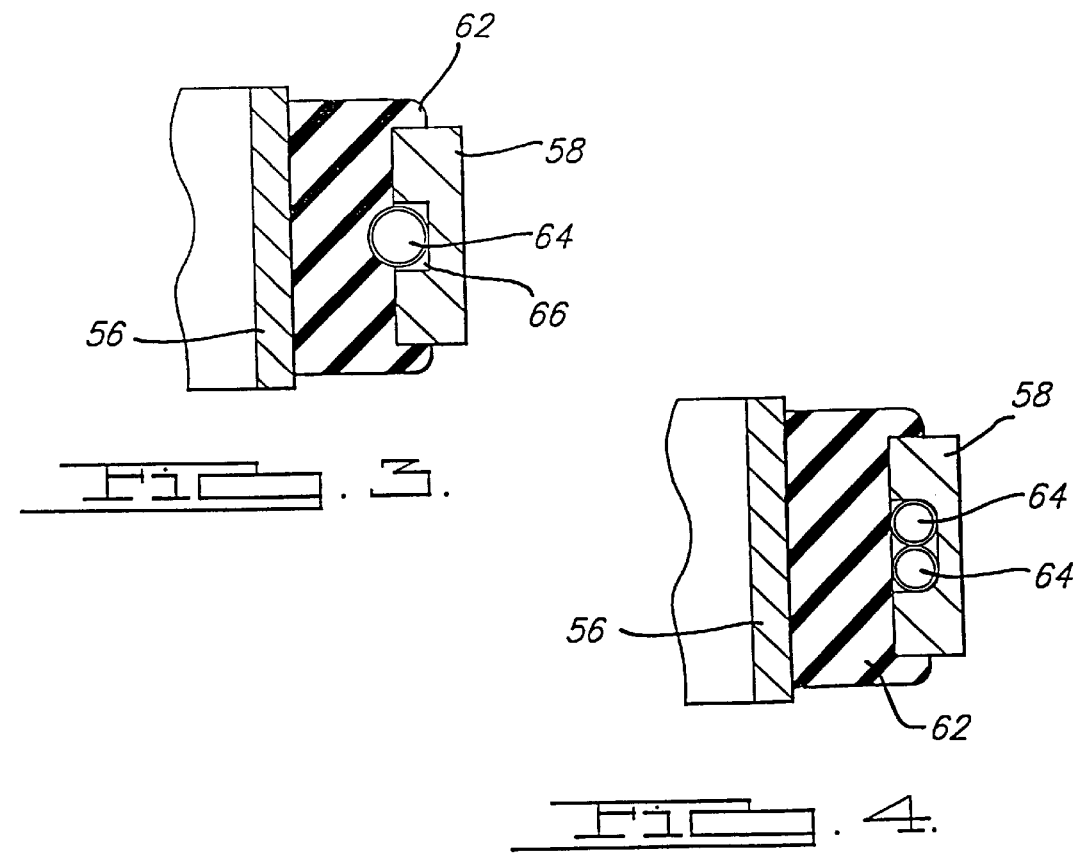
FIG. 3.
FIG. 4.

METHOD AND APPARATUS FOR DELIVERING FLUID AND OR ELECTRIC SIGNALS

This is a division of U.S. patent application Ser. No. 08/445,773 filed May, 19, 1995, now abandoned.

BACKGROUND OF THE INVENTION

1. Field of the Invention

This invention relates to a method and apparatus for delivering fluid and/or electric signals.

2. Description of Related Art

Telescopic cylinders are used in a wide variety of applications and purposes. For example, telescopic cylinders in the form of dampers are used in connection with automotive suspension systems to absorb unwanted vibrations which occur during driving. To dampen unwanted vibrations, such telescopic cylinders are generally connected between the body and the suspension of an automotive vehicle. A piston is located within the telescopic cylinder and is connected to the body of the automotive vehicle through a piston rod. Because the piston is able to limit the flow of damping fluid within the working chamber of the telescopic cylinder when the telescopic cylinder is compressed or extended, the telescopic cylinder is able to generate a damping force which "smooths" or "dampens" vibrations transmitted from the suspension to the body.

The greater the degree to which the flow of damping fluid within the working chamber is restricted by the piston, the greater the damping forces which are generated by the telescopic cylinder. Accordingly, a "soft" compression or rebound stroke is produced when the flow of damping fluid in the working chamber through the piston is relatively unrestricted. In contrast, a "firm" compression or rebound stroke is generated when there is an increased restriction in the flow of damping fluid in the working chamber through the piston.

It is often necessary to deliver fluid and/or electrical signals to a telescopic cylinder. For example, when the telescopic cylinder is used to provide adjustable damping for an automotive vehicle, there is often a need to provide a path for electrical control signals between an electronic control unit which is located exterior of the telescopic cylinder and an electrically actuated valve and/or sensors located within the telescopic cylinder. In addition, it may also be desirable to deliver hydraulic, pneumatic or other fluids to a telescopic cylinder. Such fluids may also be used for controlling damping as well as for controlling vehicle leveling.

While such telescopic cylinders have been developed which allow fluid and/or electrical signals to enter the interior of a damper, they may nevertheless have certain disadvantages. For example, the access port on the telescopic cylinder for receiving fluid from a fluid source, or electric signals from an electronic control unit, is often located such that it extends radially from the longitudinal axis of the housing of the telescopic cylinder. Locating the access port at this position on the telescopic cylinder may limit the accessibility of the access port. In addition, by limiting the access to the access port, the design packaging flexibility of the telescopic cylinder may tend to be somewhat limited. Furthermore, locating the access port on the side of the telescopic cylinder may increase the dead length of the telescopic cylinder so as to result in an unwanted decrease in the length of travel of the piston within the pressure cylinder. Finally, when electrical control signals are used to control the operation of the telescopic cylinder, the leads which are attached to the telescopic cylinder sometimes may dangle from the access port.

SUMMARY OF THE INVENTION

Accordingly, it is the primary object of the present invention to provide a method and apparatus for delivering virtually any kind of fluid and/or electric signals to a telescopic cylinder which is not located at the side of the telescopic cylinder.

A related object of the present invention is to provide a method and apparatus for delivering virtually any kind of fluid and/or electric signals to a telescopic cylinder in which the access port is located within a loop mount at the top or bottom of the telescopic cylinder.

A further object of the present invention is to provide a method and apparatus for delivering virtually any kind of fluid and/or electric signals to a telescopic cylinder which improves the accessibility of the telescopic cylinder to a source of fluid and/or electric signals.

A further object of the present invention is to provide a method and apparatus for delivering virtually any kind of fluid and/or electric signals to a telescopic cylinder which does not increase the dead length of the telescopic cylinder.

An additional object of the present invention is to provide a method and apparatus for delivering virtually any kind of fluid and/or electric signals to a telescopic cylinder which is relatively simple in construction and relatively low in cost.

The invention, in one form thereof, includes a telescopic cylinder which is able to communicate with a source of fluid and/or electrical signals external to the telescopic cylinder. The telescopic cylinder includes a housing which is operable to receive the fluid and/or electrical signals as well as means for securing the housing to a fixed member such as the body of an automotive vehicle. The telescopic cylinder also includes means for transferring the fluid and/or electrical signals from the source of fluid and/or electric signals to the housing through the means for securing the telescopic cylinder to the fixed member.

The invention, in another form thereof, relates to a method of delivering fluid from a source of fluid and/or electrical signals to the housing of a telescopic cylinder connected to a fixed member such as an automotive vehicle. The method comprises the steps of delivering fluid from the source to a mount disposed on the telescopic cylinder, the mount being operable to secure the telescopic cylinder to the fixed member. The method further includes the step of allowing fluid and/or electrical signals to flow through the mount to the housing.

BRIEF DESCRIPTION OF THE DRAWINGS

Other objects of the present invention will become apparent to one skilled in the art upon reading the following specification and by reference to the following drawings in which:

FIG. 2 is a cross-sectional view of the upper portion of the telescopic cylinder shown in FIG. 1 according to the teachings of the first preferred embodiment of the present invention;

FIG. 3 is a cross-sectional view of the mount shown in FIG. 2 taken in the direction of lines 3—3 according to the teachings of the first preferred embodiment of the present invention;

FIG. 4 is a cross-sectional view of the mount shown in FIG. 3 according to an alternative embodiment of the present invention;

DETAILED DESCRIPTION OF THE PREFERRED EMBODIMENTS

The following discussion of the preferred embodiments of the present invention is merely exemplary in nature and is not intended to limit the invention or its application or uses.

Figure 1:
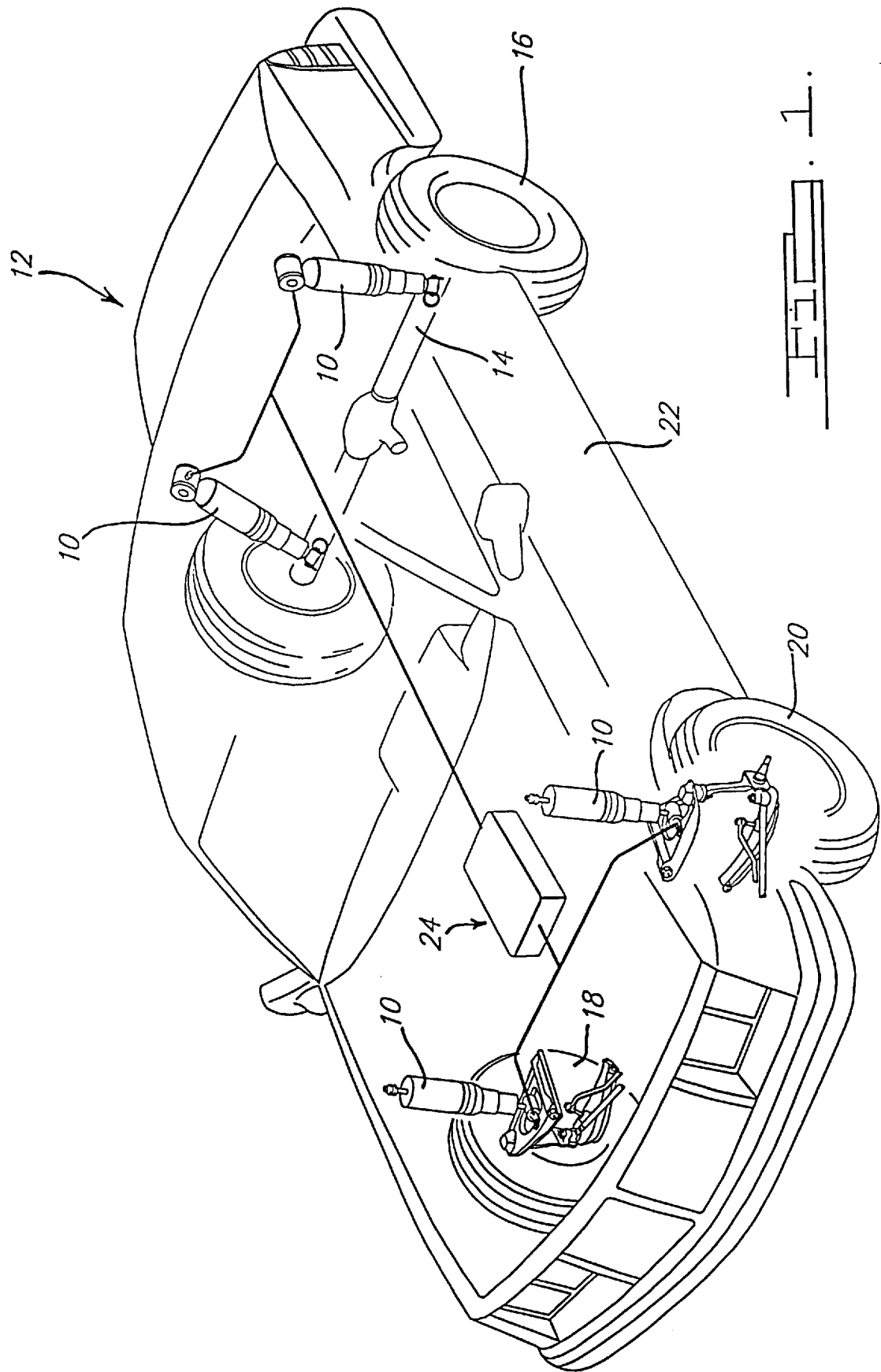
FIG. 1 is an illustration of an automotive vehicle using the method and apparatus for delivering fluid and/or electric signals to the telescopic cylinder according to the teachings of the preferred embodiments of the present invention.

Referring to FIG. 1, a plurality of four telescopic cylinders 10 according to the preferred embodiment of the present invention are shown. As used herein, the term "telescopic cylinders" should be interpreted in the broadest sense of the phrase and is meant to include virtually any type of telescopic cylinder. With respect to automotive vehicles, the term "telescopic cylinder" will be used to refer to shock absorbers, McPherson struts, hydraulic actuators, sensors or other similar components in virtually any type of automotive application. In addition, the term "telescopic cylinder" will also refer to other types of actuators and/or sensors which may be used with non-automotive applications as well.

The telescopic cylinders 10 are depicted as being attached to a fixed member such as an automotive vehicle 12. The automotive vehicle 12 includes a rear suspension system 14 adapted to operatively support the rear wheels 16 of the automotive vehicle 12. The rear suspension system 14 is operatively connected to the automotive vehicle 12 by means of a first pair of telescopic cylinders 10. Similarly, the automotive vehicle 12 has a front suspension system 18 which is used to support the front wheels 20. The front suspension system 18 is operatively connected to the automotive vehicle 12 by means of a second pair of telescopic cylinders 10.

To allow the suspension system to adjust for various loading or driving conditions, the telescopic cylinders 10 are connected to a suspension control system 24. The suspension control system 24 is used to provide a controlled delivery of fluid and/or electrical signals to the telescopic cylinders 10 so as to control various characteristics which may be associated with one or more of the telescopic cylinders 10. These include the damping characteristics generated by the telescopic cylinders 10, the vehicle leveling characteristics generated by the telescopic cylinders 10, or other characteristics of the telescopic cylinders 10 which may be controlled or sensed. The term "fluid" as used herein refers to fluid in the broadest sense of the phrase and would include under the appropriate circumstances air, nitrogen, electrorheological fluid, magnetorheological fluid or any other type of fluid which is used with the particular application in issue. While the various components of the suspension control system 24 described above may be that which is described in U.S. Pat. No. 5,135,203 which is hereby incorporated by reference, other suitable components may be used.

The structure of one of the telescopic cylinders 10 associated with the automotive vehicle 12 according to the first preferred embodiment of the present invention will now be described with reference to FIG. 2. The telescopic cylinder 10 comprises a housing 32 and a rod member 38 which is movable within the housing 32. The housing 32 may have elements associated therewith which are used to adjust the characteristics of the telescopic cylinder 10 upon the receipt or delivery of fluid and/or electrical signals from the suspension control system 24. Such elements may typically include a piston which is supported by the rod member 38 which is disposed within the housing 32 and has variable flow passages disposed therein. The rod member 38 includes a passage 40 as shown in FIG. 2, the purpose of which will be described below. It will be appreciated by those skilled in the art that while the rod member 38 will be described in conjunction with the preferred embodiment, any other moveable member which may be displaced with respect to the cylinder 10 may also be used.

To secure the telescopic cylinder 10 to the automotive vehicle 12, the telescopic cylinder 10 includes an upper mount 48 and a lower mount 50. The upper mount 48 is connected to the upper end portion of the rod member 38 and is used to secure the rod member 38 to the body 22 of the automotive vehicle 12. Similarly, the lower mount 50 is connected to the lower end portion of the housing 32 and is used to secure the housing 32 to the rear suspension system. While the upper and lower mounts 48 and 50 may be "loop-style" mounts, other suitable mounts may also be used.

The structure and operation of the upper mount 48 will now be described in greater detail. It is to be understood, however, that the lower mount 50 may function in the same manner as well as have the same structure as the upper mount 48 if desired. The upper mount 48 includes an inner annular member 56 and an outer annular member 58. The inner annular member 56 is operable to receive a bolt or other suitable fastener which is used to secure the upper mount 48 to the body 22 of the automotive vehicle 12. The outer annular member 58 the outer periphery of the upper mount 48 and includes a radially extending access port 60. The radially extending access port 60 is located at one side of the outer annular member 58 and allows access to tubular members and the like in a manner more fully described below. It is to be understood that the radially extending access port 60 may be disposed virtually anywhere around the circumference of the outer annular member 58 and may be located at any angular displacement from a plane perpendicular to the axis of the telescopic cylinder 10. Disposed between the inner annular member 56 and the outer annular member 58 is an annular bushing 62. The bushing 62 is used to reduce the transmission of vibrations between the inner annular member 56 and the outer annular member 58. As illustrated in FIGS. 3 and 4, the annular bushing 62 has a channel 63 formed therein int which a portion of the annular member 58 nests.

To allow the delivery of fluid to the telescopic cylinder 10, the upper mount 48 further includes one or several tubular members 64. The tubular member 64 extends through the access port 60 and into the passage 40 in the rod member 38. To receive the tubular member 64 within the upper mount 48, the outer annular member 58 includes a groove 66. The groove 66 extends circumferentially around the internal surface of the outer annular member 58 and is of such a shape and size as to accommodate the tubular member 64. Accordingly, the tubular member 64 is able to extend from the exterior of the telescopic cylinder 10 into the passage in the rod member 38 by passing through the access port 60 and the groove 66 in the outer annular member 58. Fluid and/or electrical signals are therefore able to be delivered from an external source to the telescopic cylinder 10 through the upper mount 48.

While the above description of the first preferred embodiment of the present invention is shown with only a single tubular member 64, the first preferred embodiment may also be used with several tubular members 64 as shown in FIG. 4. The use of several tubular members 64 may be desirable when it is useful to have separate flow paths for fluid flowing into and out of the telescopic cylinder 10. For example, the radial height of a single tubular member 64 can be reduced if the same amount of fluid is able to flow through several tubular members 64. It is to be understood that either or both of the tubular members 64 may be replaced by an electrical conductor which is able to deliver and/or receive electrical energy to and from a source of electrical energy to electrical components within the telescopic cylinder 10.

Figure 5:
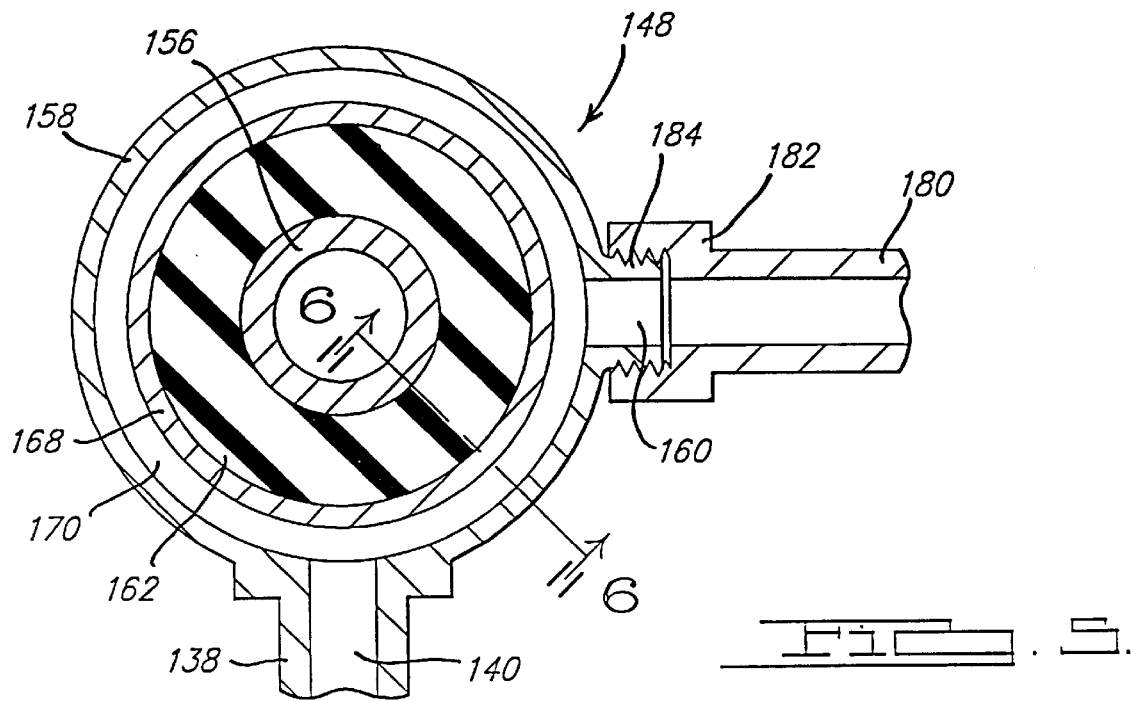
FIG. 5 is a cross-sectional view of the mount shown in FIG. 1 according to the teachings of the second preferred embodiment of the present invention.
Figure 6:
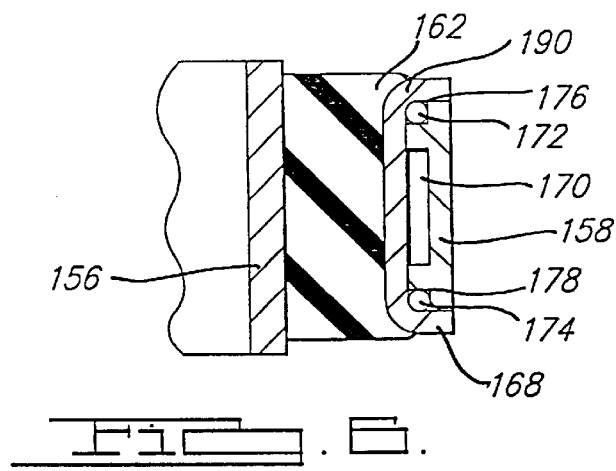
FIG. 6 is a cross-sectional view of the mount shown in FIG. 5 taken in the direction of lines 6—6 according to the teachings of the second preferred embodiment of the present invention.

The second preferred embodiment will now be described with reference to FIGS. 5 and 6. Components in FIGS. 5 and 6 which are similar to the components shown in FIGS. 2–4 have a similar reference number with 100 being added to the reference number shown in FIGS. 2–4. The upper mount 148 of the second preferred embodiment of the present invention includes an inner annular member 156 and an outer annular member 158. As with the first preferred embodiment of the present invention, the inner annular member 156 is operable to receive a suitable fastener which is used to secure the upper mount 148 to the body 22 of the automotive vehicle 12. The outer annular member 158 is disposed around the periphery of the upper mount 148 and includes a radially extending access port 160. In addition, the outer annular member 158 also includes a groove 166 (shown in cross-section in FIG. 6) which extends around the inner surface of the outer annular member 158. The upper mount 148 according to the second preferred embodiment also includes a bushing 162 which is disposed within the outer annular member 158 adjacent to the inner annular member 156.

Disposed between the bushing 162 and the outer annular member 158 is an intermediate annular member 168. The intermediate annular member 168 has a U-shaped cross-section and in conjunction with the groove 166 formed in the outer annular member 158 (as shown in FIG. 6), defines a closed channel 170. The channel 170 formed between the outer annular member 158 and the intermediate annular member 168 allows fluid communication between the access port 160 and the passage 140 in the piston rod 138. Because the channel 170 allows fluid communication between the radially extending access port 160 as well as the passage 140 in the piston rod 138, fluid flowing from the upper mount 148 into the channel 170 is able to flow into the passage 140 of the piston rod 138.

To minimize the possibility that leakage of fluid from the channel 170 may occur, the upper mount 148 further may include first and second ring seals 172 and 174. The first and second seals 172 and 174 are circular in configuration and are operable to be disposed within two recesses 176 and 178 formed within the outer annular member 158. By engaging both the intermediate annular member 168 as well as the outer annular member 158, the seals 172 and 174 prevent leakage of fluid from the channel 170. Fluid may be delivered to the channel 170 by any suitable means such as by the tubular member 180. The tubular member 180 has an internally threaded end portion 182 which is able to engage external threads 184 on the radially extending access port 160. Alternatively, the end portion 182 may have external threads while the access port 160 may have internal threads. Other suitable fittings such as compression fittings or various other kinds of sealing elements may be used to connect the tubular member 180 to the radially extending access port 160.

Figure 7:
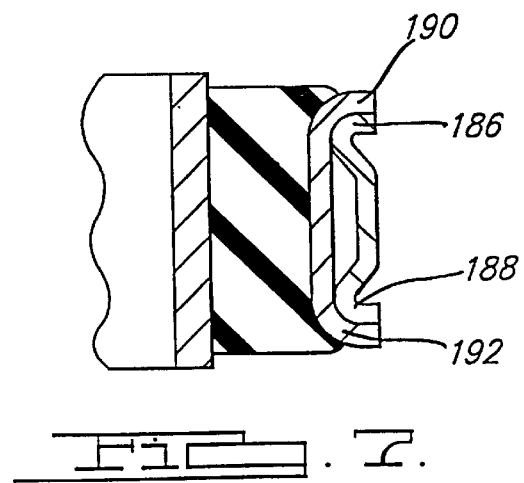
FIG. 7 is a cross-sectional view of the mount shown in FIG. 6 according to an alternative embodiment.

It will be appreciated that the channel 170 may be created by other means. For example, the outer annular member 158'  may have two shoulders 186 and 188 as shown in FIG. 7. In this embodiment, the shoulders 186 and 188 of the outer annular member 158' engage the shoulders 190 and 192 of the intermediate annular member 168 so as to create the channel 170' therebetween. Other suitable means may be used for creating the channel 170' within the upper mount 148 such as crimping and rolling.

While it will be appreciated that the preferred embodiments illustrated here are well calculated to fulfill the objects stated above, it will be appreciated that the invention is susceptible to modifications, variations and changes without departing from the scope of the invention. The present invention may be used for both monotube and twin tube telescopic cylinders and be used with telescopic cylinders which provide adjustable damping, adjustable leveling and/or obtain similar characteristics. The telescopic cylinder may also use either the flow of fluid or electrical signals to control these characteristics. In addition, the present invention may be used with any type of cylinder and virtually any type of application in which fluid or electrical signals are required to enter the inside of a cylinder from its exterior.

While the present invention has been described as being used with an upper loop mount, it will be appreciated that other mounts of different shapes and different orientations may be used. Further, the lower mount may also be used to carry fluid and/or electrical signals in a manner similar to that described above. The present invention may be used in virtually any application, automotive related or otherwise, where a mount is used to secure a cylinder to a fixed member. Accordingly, the scope of the invention is therefore to be measured against the scope of the following claims.

What is claimed is:

1. A telescopic cylinder disposed between a first member and a second member of an automotive vehicle, said telescopic cylinder communicating with a source of fluid external to said telescopic cylinder, said telescopic cylinder comprising:

a piston rod having an axially extending bore operable to receive said fluid;

a mount for securing said telescopic cylinder to one of said first and second members of said automotive vehicle, said mount comprising:

a first annular member attached directly to said piston rod;

a second annular member surrounding said first annular member, said first annular member and said second annular member defining a channel extending between said source of fluid and said piston rod;

at least one sealing member disposed between said first annular member and said second annular member, said sealing member minimizing leakage of said fluid from said channel;

an elastomeric bushing disposed within said first annular member; and a fastening member disposed within said elastomeric bushing, said fastening member being adapted to secure said telescopic cylinder to said one of said first and second members.

2. The telescopic cylinder according to claim 1 wherein, said mount includes a radially extending access port in fluid communication with said source of fluid.

3. The telescopic cylinder according to claim 1 wherein, said at least one sealing member is integral with said first annular member.

4. The telescopic cylinder according to claim 1 wherein, said at least one sealing member comprises a pair of ring seals disposed on opposite sides of said channel.

* * * * *

UNITED STATES PATENT AND TRADEMARK OFFICE
CERTIFICATE OF CORRECTION

PATENT NO. : 5,839,552
DATED : November 24, 1998
INVENTOR(S) : Bart Vandewal et al It is certified that error appears in the above-identified patent and that said Letters Patent is hereby corrected as shown below:

Title Page, [57] Abstract, line 7 "telescopic cylinder (1)" should be --telescopic cylinder (10)--;

Col. 1, line 6, "No. 08/445,773" should be --No. 08/445,173--;

Col. 4, line 37, after "member 58." insert --As illustrated in Figs. 3 and 4, the annular bushing 62 has a channel 63 formed therein in which a portion of the annular member 58 nests.--

Signed and Sealed this

Twenty-second Day of June, 1999

Attest:

Q. TODD DICKINSON

*Attesting Officer*    *Acting Commissioner of Patents and Trademarks*